Sept. 17, 1929. R. CHRISTIANSON 1,728,331
LAWN SMOOTHING IMPLEMENT
Filed Dec. 17, 1927

INVENTOR.
RICHARD CHRISTIANSON.
By Arthur L. Slee
ATTY.

Patented Sept. 17, 1929

1,728,331

UNITED STATES PATENT OFFICE

RICHARD CHRISTIANSON, OF SANTA CRUZ, CALIFORNIA

LAWN-SMOOTHING IMPLEMENT

Application filed December 17, 1927. Serial No. 240,805.

My invention relates to improvements in implements for smoothing and dressing lawns and the like wherein a toothed member is supported upon a roller and arranged to be moved through the grass of a lawn to comb said grass and remove weeds therefrom, the combed lawn being rolled smooth by the roller.

The primary object of my invention is to provide an improved lawn smoothing or dressing implement.

Another object is to provide an improved device which will facilitate the removal of weeds and the smoothing and dressing of a lawn.

A further object is to provide an improved implement whereby a lawn may be weeded, combed, and rolled smooth at a single operation.

A still further object is to provide an improved device which is simple in construction and which is simple and efficient in operation.

I accomplish these and other objects by means of the improved device disclosed in the drawings forming a part of the present application wherein like characters of reference are used to designate similar parts throughout the specification and drawings and in which—

Figure 1:
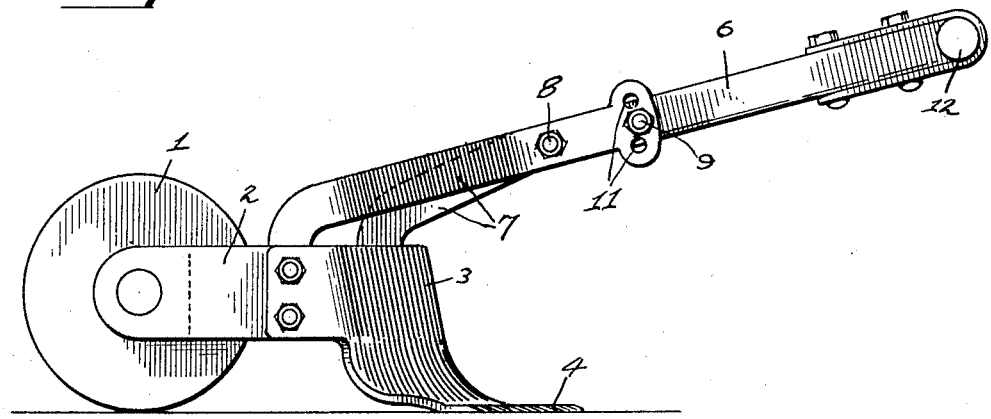
Fig. 1 is a side elevation of my improved lawn smoothing device.
Figure 2:
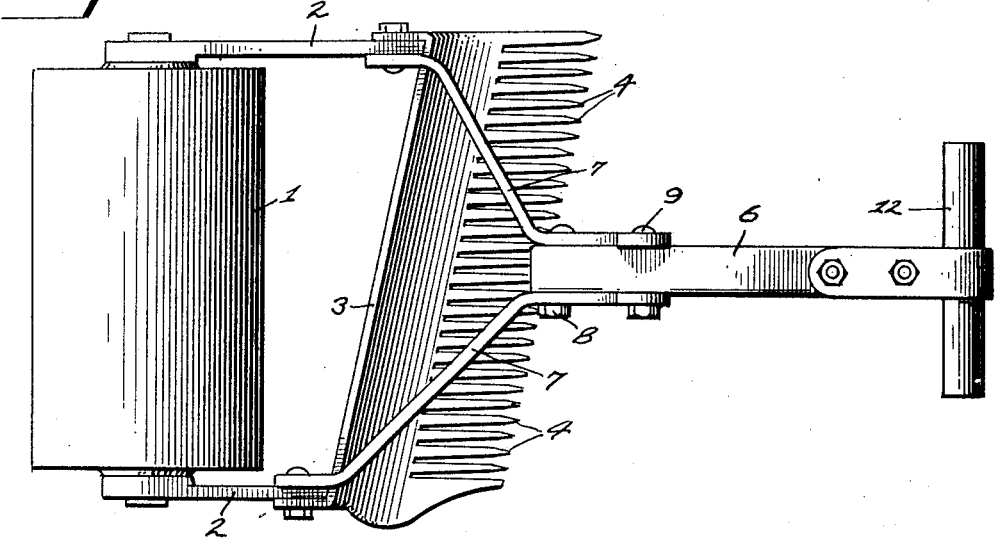
Fig. 2 is a plan view of the device.

Referring to the drawings, the numeral 1 is used to designate a roller rotatably mounted between a pair of arms 2 connected across their forward ends by a member 3 to form a yoke. The member 3 extends downwardly and the lower edge of said member is curved forwardly and formed into a plurality of teeth 4 extended forwardly in substantially parallel relation to a supporting surface upon which the roller and teeth may rest. The member 3 and outer ends of the teeth 4 are arranged angularly disposed with respect to the axis of the roller 1.

A handle 6 is secured by means of a pair of diverging braces 7 to the yoke. The handle is preferably pivotally connected between the braces 7 as at 8 and arranged to be secured in a desired angular adjustment to said braces by a securing member 9 arranged to engage any of a plurality of openings 11 formed in the ends of said braces. A transverse bar 12 is secured upon the end of the handle 6 to form hand holds whereby the device may be operated manually. The braces 7 and handle 6 extend angularly upward and forward from the yoke when said yoke is in normal horizontal position with the teeth 4 resting upon a surface supporting the roller 1.

In operation, the device is operated manually by means of the handle 6, the implement being pulled forwardly along the lawn to cause the teeth 4 to pass through the grass close to the ground. As the teeth 4 are moved through the grass, weeds and the like being of a more bulky growth, are engaged between the teeth 4 and, by lifting the handle slightly, the yoke, and toothed member forming a part thereof, is swung pivotally upward upon the axis of the roller to pull said weeds from the ground. The weeds thus removed from the lawn pile up upon the front of the member 3 and the lawn is thus effectually weeded and combed. As the toothed member 3 is manipulated over the lawn, the roller 1, which serves to form a support in back of the member 3, is rolled over the weeded and combed lawn to roll and smooth the lawn surface, the loosened soil being thus packed down smooth after the removal of weeds. The member 3, and the ends of the teeth 4 are disposed at an angle relative to the axis of the roller to facilitate the manipulation of the teeth through the lawn and to tend to roll weeds collected upon the member 3 toward one side of the implement to prevent cluttering of a finished portion of lawn by weeds being removed from adjacent portions of the lawn.

The handle 6 is arranged to permit a pivotal adjustment whereby the elevation of the end of the handle may be regulated to suit the convenience and comfort of an operator.

While I have illustrated and described only the preferred embodiment of my invention, the device is of course subject to modification in numerous details of construction. I therefore do not wish to restrict myself to the specific details disclosed, but desire to avail myself of all modifications which may fall within the scope of the appended claim.

Having thus described my invention what I claim as new and desire to secure by Letters Patent is—

A lawn smoothing device comprising a yoke; a lawn roller rotatably mounted between the arms of the yoke; a member secured upon the yoke in front of the roller and angularly disposed thereto, said member being provided with a plurality of teeth curved forwardly into substantially parallel relation to the ground; and a handle connected to the yoke for moving the toothed member and roller over the lawn.

In witness whereof, I hereunto set my signature.

RICHARD CHRISTIANSON.